(12) United States Patent
Lietzau et al.

(10) Patent No.: US 7,767,277 B2
(45) Date of Patent: *Aug. 3, 2010

(54) FLUOROPHENYL COMPOUNDS FOR LIQUID-CRYSTALLINE MIXTURES

(75) Inventors: Lars Lietzau, Darmstadt (DE); Markus Czanta, Darmstadt (DE); Harald Hirschmann, Darmstadt (DE); Michael Wittek, Darmstadt (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 197 days.

This patent is subject to a terminal disclaimer.

(21) Appl. No.: 11/898,404

(22) Filed: Sep. 12, 2007

(65) Prior Publication Data

US 2008/0132716 A1 Jun. 5, 2008

(30) Foreign Application Priority Data

Sep. 13, 2006 (DE) ........................ 10 2006 042 859

(51) Int. Cl.
| | |
|---|---|
| C09K 19/34 | (2006.01) |
| C09K 19/30 | (2006.01) |
| C09K 19/12 | (2006.01) |
| C07C 25/13 | (2006.01) |
| C07C 43/225 | (2006.01) |
| C07D 319/06 | (2006.01) |
| C07D 309/06 | (2006.01) |

(52) U.S. Cl. ............. 428/1.1; 252/299.61; 252/299.63; 252/299.66; 570/127; 570/129; 568/642; 568/643; 549/369; 549/374; 549/427

(58) Field of Classification Search ................. 428/1.1, 428/1.3; 252/299.01, 299.61, 299.63, 299.66; 570/127, 129; 568/642, 643; 549/369, 374, 549/427

See application file for complete search history.

(56) References Cited

U.S. PATENT DOCUMENTS

| | | | |
|---|---|---|---|
| 5,589,102 A | 12/1996 | Bartmann et al. | |
| 6,723,866 B2 * | 4/2004 | Kirsch et al. | 558/17 |
| 7,250,198 B2 * | 7/2007 | Heckmeier et al. | 428/1.1 |
| 7,595,101 B2 * | 9/2009 | Wittek et al. | 428/1.1 |
| 2003/0213935 A1 * | 11/2003 | Heckmeier et al. | 252/299.61 |
| 2003/0216554 A1 * | 11/2003 | Kirsch et al. | 534/577 |
| 2005/0205842 A1 | 9/2005 | Heckmeier et al. | |
| 2009/0101869 A1 * | 4/2009 | Czanta et al. | 252/299.66 |

FOREIGN PATENT DOCUMENTS

| | | |
|---|---|---|
| DE | 102 29 476 A1 | 2/2003 |
| DE | 102 43 776 A1 | 4/2003 |
| DE | 10 2004 056 901 A1 | 7/2005 |
| EP | 0 786 445 | 7/1997 |
| WO | WO 01/64667 | 9/2001 |
| WO | WO 2007/118623 A1 | 10/2007 |

* cited by examiner

*Primary Examiner*—Shean C Wu
(74) *Attorney, Agent, or Firm*—Millen, White, Zelano & Branigan, P.C.

(57) ABSTRACT

Disclosed are compounds of formula I

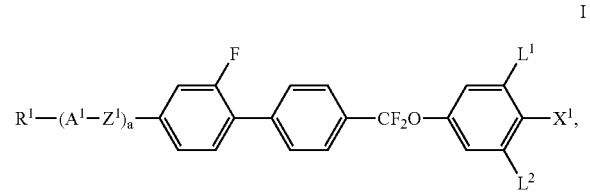

processes for the preparation thereof, and liquid-crystalline media and electro-optical displays containing said compounds.

12 Claims, No Drawings

FLUOROPHENYL COMPOUNDS FOR LIQUID-CRYSTALLINE MIXTURES

The invention relates to compounds of the formula I as defined below, to a process for the preparation thereof, and to the use thereof as component(s) in liquid-crystalline media. In addition, the present invention relates to liquid-crystal and electro-optical display elements which contain the liquid-crystalline media according to the invention. The compounds according to the invention contain, as structural element, a difluoromethyleneoxy group on a biphenyl group fluorinated in a certain way.

In the preceding years, the areas of application of liquid-crystalline compounds have been considerably broadened to various types of display device, electro-optical devices, electronic components, sensors, etc. For this reason, a number of different structures have been proposed, in particular in the area of nematic liquid crystals. The nematic liquid-crystal mixtures have to date found the broadest application in flat display devices. They have been employed, in particular, in passive TN or STN matrix displays or systems having a TFT active matrix.

The liquid-crystalline compounds according to the invention can be used as component(s) of liquid-crystalline media, in particular for displays based on the principle of the twisted cell, the guest-host effect, the effect of deformation of aligned phases DAP or ECB (electrically controlled birefringence), the IPS (in-plane switching) effect or the effect of dynamic scattering.

The use of certain derivatives containing a difluoromethyleneoxy bridge (—$CF_2O$—) as liquid-crystalline substances is known to the person skilled in the art. Various compounds containing a difluoromethyleneoxy bridge have already been described as liquid-crystalline material, as has the preparation thereof, such as, for example, in the publication EP 0786445 A1.

The present invention had the object of finding novel stable compounds which are suitable as component(s) of liquid-crystalline media. In particular, the compounds should simultaneously have comparatively low viscosity and a dielectric anisotropy in the positive region. For many current mixture concepts in the area of liquid crystals, it is advantageous to use compounds having high dielectric anisotropy $\Delta\epsilon$.

In view of the very wide variety of areas of application of compounds of this type having high $\Delta\epsilon$, it was desirable to have available further compounds, preferably having high nematogeneity, which have properties which are precisely customised to the particular applications.

It was thus an object of the invention to find novel stable compounds which are suitable as component(s) of liquid-crystalline media, in particular for, for example, TN, STN, IPS and TN-TFT displays.

It was a further object of the present invention to provide compounds which have, per se or in mixtures, high dielectric anisotropy $\Delta\epsilon$, a high clearing point and low rotational viscosity $\gamma_1$. In addition, the compounds according to the invention should be thermally and photochemically stable under the conditions prevailing in the areas of application. Furthermore, the compounds according to the invention should as far as possible have a broad nematic phase. As mesogens, they should facilitate a broad nematic phase in mixtures with liquid-crystalline co-components and have excellent miscibility with nematic base mixtures, in particular at low temperatures. Preference is likewise given to substances having a low melting point and a low enthalpy of melting since these quantities are in turn a sign of the desirable properties mentioned above, such as, for example, high solubility, a broad liquid-crystalline phase and a low tendency towards spontaneous crystallisation in mixtures at low temperatures. In particular, solubility at low temperature while avoiding any crystallisation is important for the reliable operation and transport of displays in vehicles and aircraft and outdoors.

Surprisingly, it has been found that the compounds according to the invention are eminently suitable as components of liquid-crystalline media. They can be used to obtain liquid-crystalline media for displays which require particularly high dielectric anisotropies, in particular for TN-TFT and STN displays, but also for IPS systems or more recent concepts. The compounds according to the invention have adequate stability and are colourless. They are also distinguished by strongly positive dielectric anisotropies $\Delta\epsilon$, due to which lower threshold voltages are required on use in optical switching elements. They have a particularly broad nematic phase range. In addition, the compounds according to the invention have a high clearing point and at the same time low values for the rotational viscosity. Compared with substances from the prior art, significantly lower melting points and enthalpies of melting are observed.

The provision of the compounds according to the invention very generally considerably broadens the range of liquid-crystalline substances which are suitable, from various applicational points of view, for the preparation of liquid-crystalline mixtures.

The compounds according to the invention have a broad range of applications. Depending on the choice of substituents, these compounds can serve as base materials of which liquid-crystalline media are predominantly composed. However, it is also possible to add liquid-crystalline base materials from other classes of compound to the compounds according to the invention in order, for example, to modify the dielectric and/or optical anisotropy of a dielectric of this type and/or to optimise its threshold voltage and/or its viscosity.

The invention thus relates to compounds of the formula I

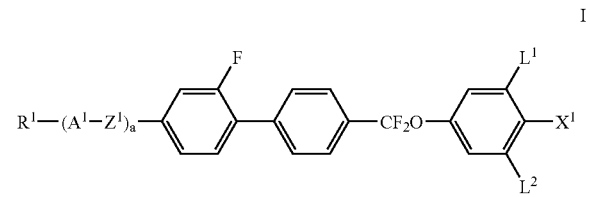

in which $R^1$ denotes H, F, Cl, Br, a halogenated or unsubstituted alkyl radical having 1 to 15 C atoms, where, in addition, one or more $CH_2$ groups in these radicals may each, independently of one another, be replaced by —C≡C—, —CH=CH—, —(CO)O—, —O(CO)—, —(CO)— or —O— in such a way that O atoms are not linked directly to one another, $A^1$ denotes a) trans-1,4-cyclohexylene or cyclohexenylene, in which, in addition, one or more non-adjacent $CH_2$ groups may be replaced by —O— and/or —S— and in which H may be substituted by F, b) 1,4-phenylene, in which one or two CH groups may be replaced by N and in which, in addition, one or more H atoms may be replaced by Br, Cl, F, CN, methyl, methoxy or a mono- or polyfluorinated methyl or methoxy group, $Z^1$ denotes a single bond, —$CH_2O$—, —(CO)O—, —$CF_2O$—, —$CH_2CH_2CF_2O$—, —$CF_2CF_2$—, —CH$_2$CF$_2$—, —CH$_2$CH$_2$—, —(CH$_2$)$_4$—, —CH=CH—, —CH=CF—, —CF=CF— or —C≡C—, where asymmetrical bridges may be oriented to both sides, L$^1$ and L$^2$, independently of one another, denote H or F, X$^1$ denotes F, Cl, CN, NCS, SF$_5$, a halogenated alkyl radical, halogenated alkoxy radical, halogenated alkenyl radical or halogenated alkenyloxy radical, each having up to 7 C atoms, and a denotes 0, 1 or 2, preferably 0 or 1.

The invention furthermore relates to the use of the compounds of the formula I in liquid-crystalline media.

The present invention likewise relates to liquid-crystalline media having at least two liquid-crystalline components which comprise at least one compound of the formula I.

In the pure state, the compounds of the formula I are colourless and form, per se or in mixtures, liquid-crystalline mesophases in a temperature range which is favourably located for electro-optical use. The compounds according to the invention enable broad nematic phase ranges to be achieved. In liquid-crystalline mixtures, the substances according to the invention suppress smectic phases and result in a significant improvement in the low-temperature storage stability.

Preference is given to compounds of the formula I in which a is 0 or 1, in particular a=0.

Z$^1$, if present, preferably denotes a single bond, —CF$_2$O—, —OCF$_2$—, —C$_2$F$_4$—, —CH$_2$O—, —OCH$_2$— or —(CO)O—, in particular a single bond.

A$^1$ preferably denotes

 , 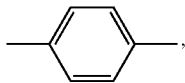 ,

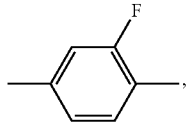 , 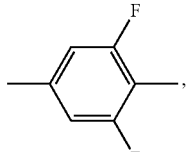 , and furthermore

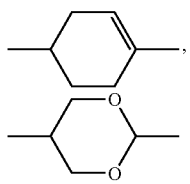 , 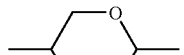 or

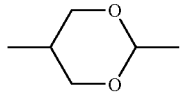

The structural elements A$^1$ and Z$^1$, in the case where they occur a number of times (a>1), may in each case adopt identical or different meanings.

R$^1$ preferably denotes alkyl, alkoxy, alkenyl or alkenyloxy having up to 8 carbon atoms. R$^1$ particularly preferably denotes unbranched alkyl or alkenyl.

X$^1$ preferably denotes F, Cl, CN, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_3$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CHF$_2$. It is very particularly preferred for X$^1$ in the compounds of the formula I according to the invention to denote a group from F, Cl, CF$_3$, OCF$_3$, OCHF$_2$ or CN, of these in particular F or OCF$_3$.

Particular preference is given to compounds of the formula IA

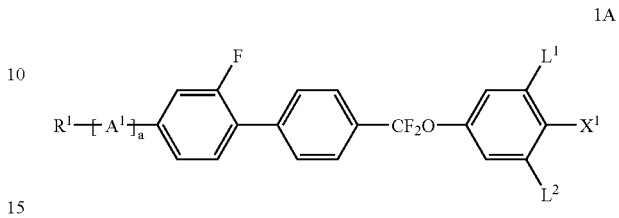

in which

R$^1$, A$^1$, L$^1$, L$^2$, X$^1$ and a have the meanings indicated above for formula I.

Preference is given to compounds of the formulae I and IA in which at least one of L$^1$ and L$^2$ denotes a fluorine, in particular those in which both denote F.

Particularly preferred compounds of the formula I or IA are the compounds of the formulae I1 to I8

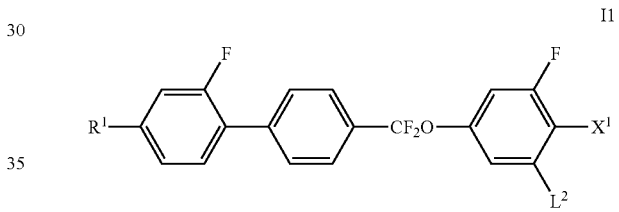

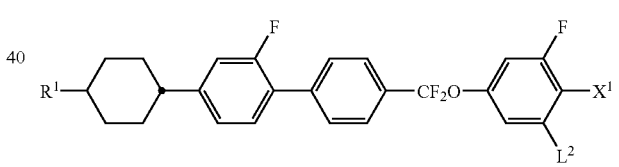

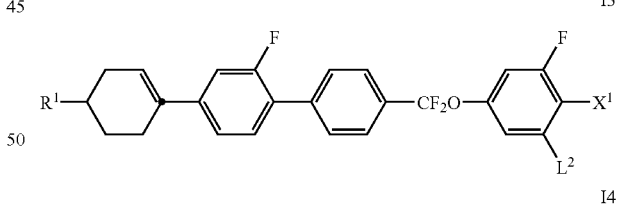

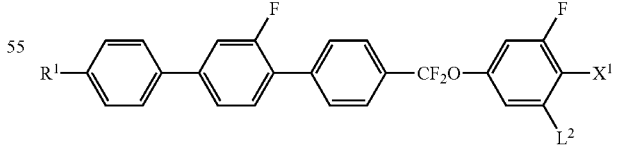

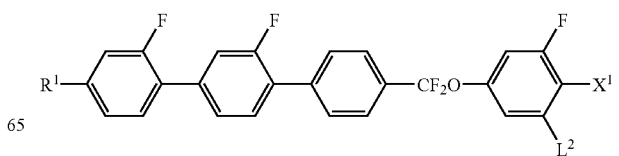

-continued

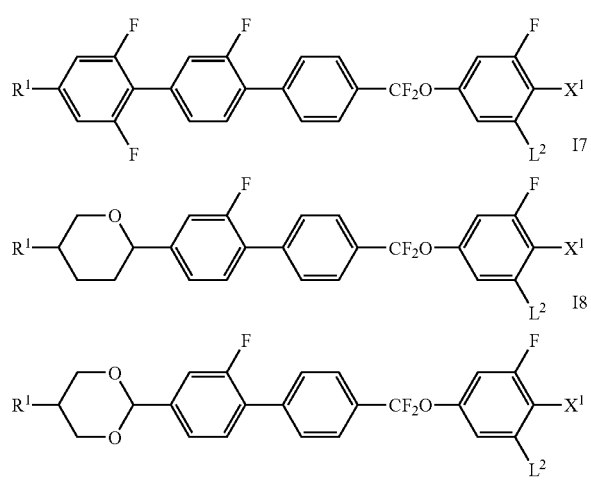

in which $R^1$ and $X^1$ have the meanings indicated above, in particular the preferred meanings or combinations thereof. $L^2$ preferably denotes F. Of the compounds of the formulae I1 to I8, the formulae I1, I2 and I4, furthermore I7 are preferred, in particular the compounds of the formulae I1 and I4.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

The compounds of the formula I can advantageously be prepared as shown by the following illustrative syntheses and the examples (scheme 1):

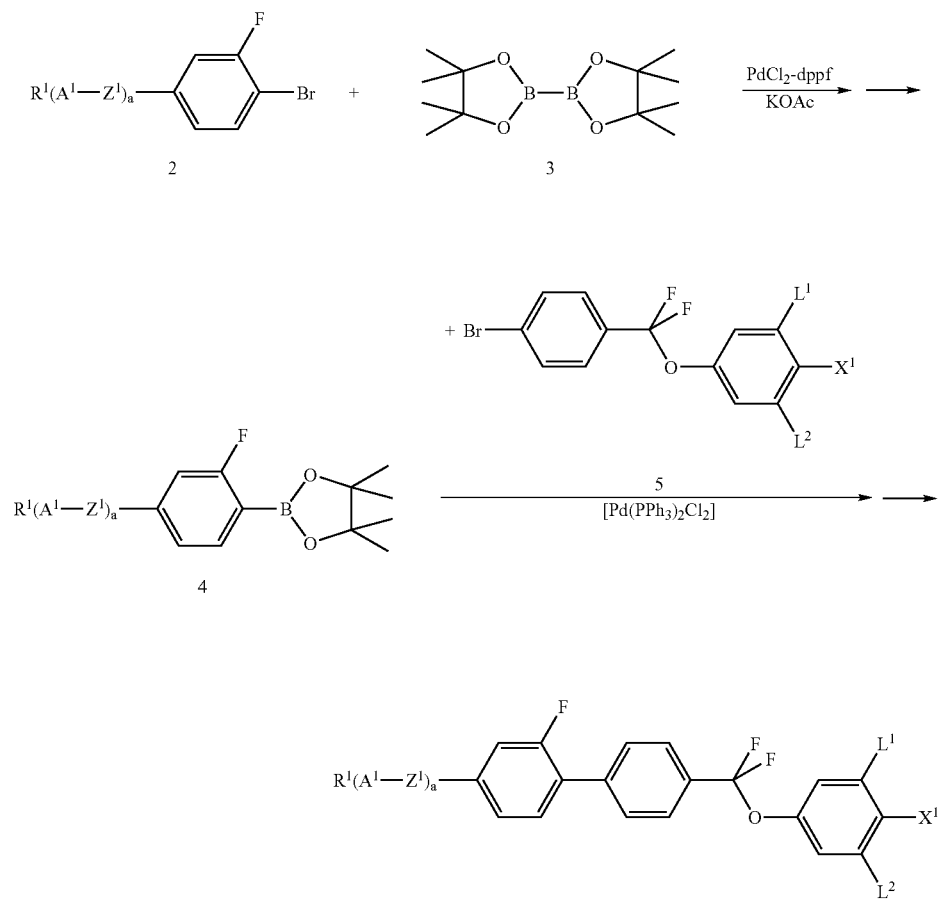

In general, corresponding starting materials can readily be prepared by the person skilled in the art via synthetic methods known from the literature. The alkyl radicals of the boronic acid ester 4 can be replaced by other alkyl groups, etc., or by hydrogen atoms. The synthesis of the corresponding boronic acids or boronic acid esters analogous to 4 is carried out analogously or by metallation of 2 at very low temperatures with subsequent reaction with suitable simple boron compounds, such as, for example, alkyl borates.

The synthetic unit 5 is prepared by the process described in the publication WO 01/064667 A1: p-bromobenzoic acid is converted into the corresponding dithianylium triflate on a water separator in the presence of propanedithiol and trifluoromethanesulfonic acid. The triflate is converted into the synthetic unit 5 in an oxidative fluorination using DBH and triethylamine trishydrofluoride as fluorinating reagent (scheme 2).

Scheme 2. Preparation of the synthetic unit 5.

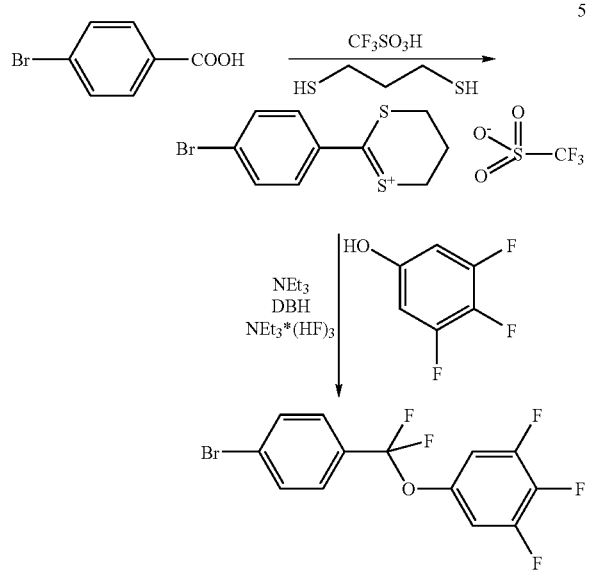

Instead of the bromides in compound 5, it is also possible to use iodides or leaving groups having comparable reactivity (for example the triflate group).

The invention therefore also relates to a process for the preparation of compounds of the formula I comprising a process step wherein a boronic acid of the formula IIA or an open-chain or cyclic boronic acid ester of the formula IIB

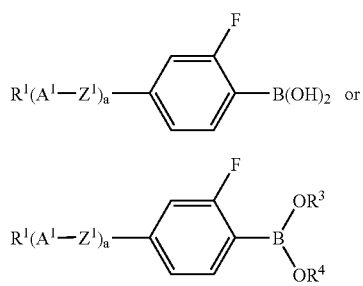

in which $R^1$, $A^1$, $Z^1$ and a are as defined for formula I, and $R^3$, $R^4$ denote an alkyl having 1-12 C atoms or $R^3+R^4$ together also denote a 2-10 C alkylene, in particular of the formulae $-CH_2-(CH_2)_p-CH_2-$ and $-C(CH_3)_2C(CH_3)_2-$, or 1,2-phenylene, where phenylene, $R^3$, $R^4$ and $R^3+R^4$ may also be substituted and where p is 0 or 1, is reacted with a compound of the formula III

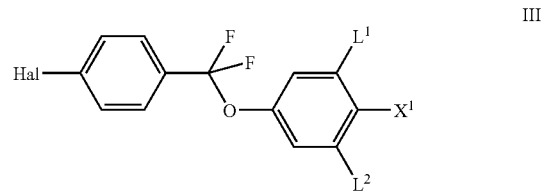

in which $L^1$, $L^2$ and $X^1$ are as defined for formula I, and

Hal denotes Cl, Br, I or $O(SO_2)CF_3$, in the presence of a transition-metal catalyst. A compound of the formula I is formed.

The transition-metal catalyst is preferably a palladium complex in oxidation state 0, II or IV. The reaction is preferably carried out in the homogeneous phase using a soluble catalyst. The complexes are particularly preferably bis(triphenylphosphine)palladium(II) chloride. The reaction methods and reagents used are in principle known from the literature. Further reaction conditions are revealed by the working examples.

An alternative to the process described consists in exchanging the reactive groups of the reactants (boronic acid derivative and halide). This gives rise to a further process according to the invention for the preparation of compounds of the formula I comprising a process step wherein a compound containing a leaving group Hal', of the formula IV

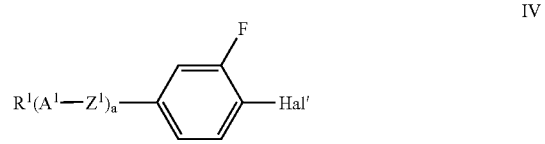

in which $R^1$, $A^1$, $Z^1$ and a are as defined for formula I, and

Hal' denotes $-O(SO_2)CF_3$, Cl, Br or I, is reacted with a boronic acid or an open-chain or cyclic boronic acid ester of the formula V

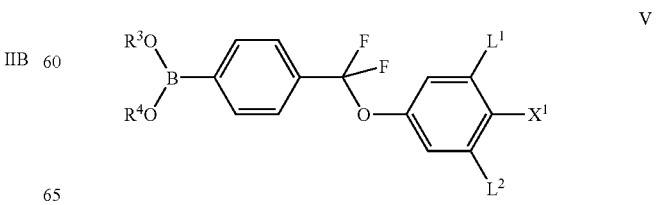

in which L¹, L² and X¹ are as defined for formula I and

R³, R⁴ denote H, an alkyl having 1-12 C atoms or R³+R⁴ together also denote a 2-10 C alkylene, in particular of the formulae —CH₂—(CH₂)$_p$—CH₂— and —C(CH₃)₂C (CH₃)₂—, or 1,2-phenylene, where phenylene, R³, R⁴ and R³+R⁴ may also be substituted and where p is 0 or 1, in the presence of a transition-metal catalyst.

Phenylene, R³, R⁴ or R³+R⁴ may be mono- or polysubstituted by simple unreactive groups, such as 1-5 C alkyl or alkoxy, Cl, CN, —(CO)O-alkyl, etc.

Further preferred process variants which have not been mentioned above are revealed in the examples or the claims.

The invention also relates to liquid-crystalline media comprising one or more of the compounds of the formula I according to the invention. The liquid-crystalline media comprise at least two components. They are preferably obtained by mixing the components with one another. A process according to the invention for the preparation of a liquid-crystalline medium is therefore characterised in that at least one compound of the formula I is mixed with at least one further mesogenic compound, and additives are optionally added.

The achievable combinations of clearing point, viscosity at low temperature, thermal and UV stability and dielectric anisotropy are far superior to previous materials from the prior art.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylidene-anilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexanes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

R'-L-E-R"  1

R'-L-COO-E-R"  2

R'-L-CF₂O-E-R"  3

R'-L-CH₂CH₂-E-R"  4

R'-L-C≡C-E-R"  5

In the formulae 1, 2, 3, 4 and 5, L and E, which may be identical or different, each, independently of one another, denote a divalent radical from the group formed by the structural elements -Phe-, -Cyc-, -Phe-Phe-, -Phe-Cyc-, -Cyc-Cyc-, -Pyr-, -Dio-, -Py-, -G-Phe-, -G-Cyc- and their mirror images, where Phe denotes unsubstituted or fluorine-substituted 1,4-phenylene, Cyc denotes trans-1,4-cyclohexylene, Pyr denotes pyrimidine-2,5-diyl or pyridine-2,5-diyl, Dio denotes 1,3-dioxane-2,5-diyl, Py denotes tetrahydropyran-2, 5-diyl and G denotes 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe, Py and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS or —(O)$_i$CH$_{3-k}$F$_k$, where i is 0 or 1 and k is 1, 2 or 3.

In a smaller sub-group of the compounds of the formulae 1, 2, 3, 4 and 5, R' and R" each, independently of one another, denote alkyl, alkenyl, alkoxy, alkoxyalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is referred to as group B, R" denotes —F, —Cl, —NCS or —(O)$_i$CH$_{3-k}$F$_k$, where i is 0 or 1 and k is 1, 2 or 3. The compounds in which R" has this meaning are referred to by the sub-formulae 1b, 2b, 3b, 4b and 5b. Particular preference is given to those compounds of the sub-formulae 1b, 2b, 3b, 4b and 5b in which R" has the meaning —F, —Cl, —NCS, —CF₃, —OCHF₂ or —OCF₃.

In the compounds of the sub-formulae 1b, 2b, 3b, 4b and 5b, R' has the meanings indicated in the case of the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN. This sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' has the meanings indicated in the case of the compounds of the sub-formulae 1a to 5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides compounds of the formula I according to the invention, the media according to the invention preferably comprise one or more compounds selected from groups A, B and/or C. The proportions by weight of the compounds from these groups in the media according to the invention are preferably:

group A: 0 to 90%, preferably 20 to 90%, particularly preferably 30 to 90%;
group B: 0 to 80%, preferably 10 to 80%, particularly preferably 10 to 65%;
group C: 0 to 80%, preferably 0 to 80%, particularly preferably 0 to 50%;

where the sum of the proportions by weight of the group A, B and/or C compounds present in the respective media according to the invention is preferably 5 to 90% and particularly preferably 10 to 90%.

The media according to the invention preferably comprise 1 to 40%, particularly preferably 5 to 30%, of the compounds according to the invention.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The dielectrics may also comprise further additives known to the person skilled in the art and described in the literature. For example, 0 to 15%, preferably 0 to 10%, of pleochroic dyes, chiral dopants, stabilisers or nanoparticles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds, are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a nematic liquid-crystal mixture having positive dielectric anisotropy and high specific resistance located in the cell) which contain media of this type, and to the use of these media for electro-optical purposes.

The expression "alkyl" encompasses unbranched and branched alkyl groups having 1-9 carbon atoms, in particular the unbranched groups methyl, ethyl, propyl, butyl, pentyl, hexyl and heptyl. Groups having 2-5 carbon atoms are generally preferred.

The expression "alkenyl" encompasses unbranched and branched alkenyl groups having up to 9 carbon atoms, in particular the unbranched groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The expression "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$. The expression "halogenated alkenyl radical" and related expressions are explained correspondingly.

The total amount of compounds of the formula I in the mixtures according to the invention is not crucial. The mixtures may therefore comprise one or more further components for the purposes of optimisation of various properties.

The construction of the matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

A significant difference between the displays according to the invention and the hitherto conventional ones based on the twisted nematic cell consists, however, in the choice of the liquid-crystal parameters of the liquid-crystal layer.

The following examples are intended to explain the invention without restricting it. The person skilled in the art will be able to glean from the examples working details that are not given in detail in the general description, generalise them in accordance with general expert knowledge and apply them to a specific problem.

Above and below, percentage data denote percent by weight. All temperatures are indicated in degrees Celsius. Furthermore, C=crystalline state, N=nematic phase, Sm=smectic phase and I=isotropic phase. The data between these symbols represent the transition temperatures. Δn denotes optical anisotropy (589 nm, 20° C.), Δ∈ the dielectric anisotropy (1 kHz, 20° C.) and $γ_1$ the rotational viscosity (20° C.; in the unit mPa·s).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δ∈ of the individual substances is determined at 20° C. and 1 kHz. To this end, 5-10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm, the rotational viscosity $γ_1$ at 20° C., both likewise by linear extrapolation.

The following abbreviations are used:

| | |
|---|---|
| p-TsOH | p-toluenesulfonic acid |
| THF | tetrahydrofuran |
| MTB ether | methyl t-butyl ether |
| DBH | 1,3-dibromo-5,5-dimethylhydantoin |
| Cyc | cyclohexyl |
| dppf | 1,1'-bis(diphenylphosphanyl)ferrocene) |
| DMAP | 4-(N,N-dimethylamino)pyridine |
| RT | room temperature |

EXAMPLE 1

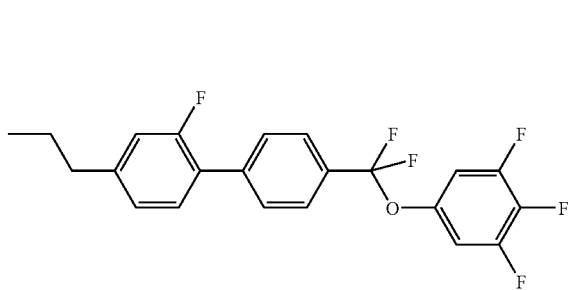

Step 1.1

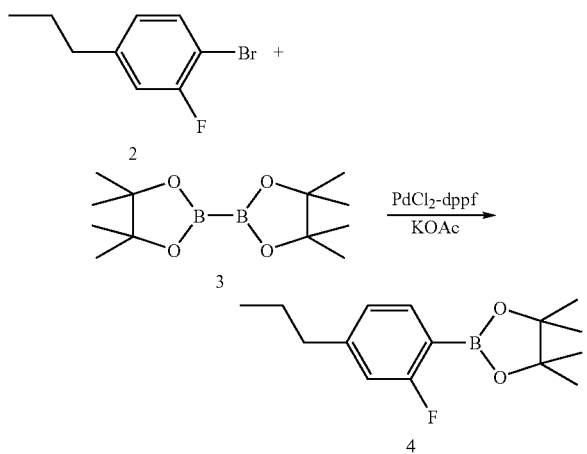

71 g (276 mmol) of the boron compound 3, 67 g (690 mmol) of potassium acetate and 5 g (7 mmol) of $PdCl_2$-dppf are added to a solution of 50 g (230 mmol) of the bromide 2 in 590 ml of dioxane, and the mixture is warmed at 100° C. for 17 h. Water is added to the cooled batch, which is extracted with MTB ether. The organic phase is dried over sodium sulfate and evaporated. The residue is filtered through silica gel (n-heptane). The residue 4 obtained is employed in the subsequent step without further purification.

Step 1.2

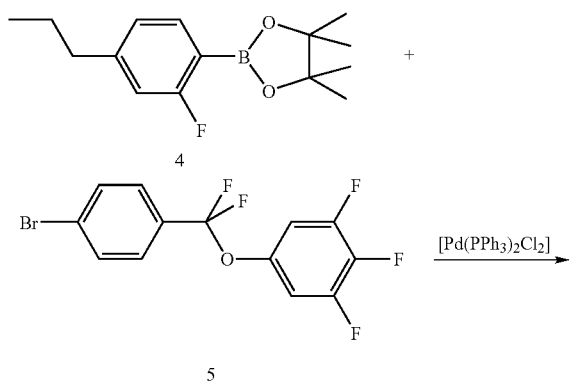

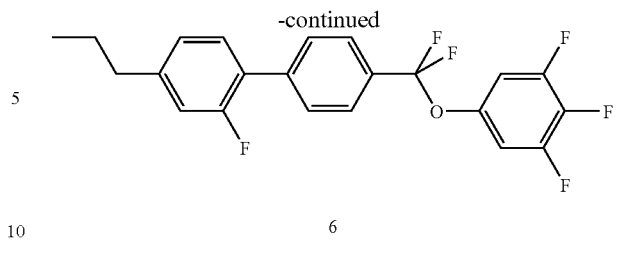

21 g (75 mmol) of sodium metaborate octahydrate are initially introduced in 38 ml of water, and 40 ml of THF, 0.15 ml (1 mmol) of hydrazinium hydroxide and 0.7 g (1 mmol) of bis(triphenylphosphine)palladium(II) chloride are added, and the mixture is stirred at RT for 5 min. A solution of 14.8 g (89%; 50 mmol) of the boronic acid ester 4 and 17.7 g (50 mmol) of the bromide 5 is subsequently added to the batch. After stirring under reflux for 6 h, the reaction mixture is diluted with MTB ether. The organic phase is evaporated. The residue is filtered through silica gel (n-heptane). The final purification of the product is carried out by crystallisation from heptane.

C 26 I $\Delta\epsilon$ 20

$\Delta n$ 0.131

$\gamma_1$ 62 mPa·s

The following compounds of the formula

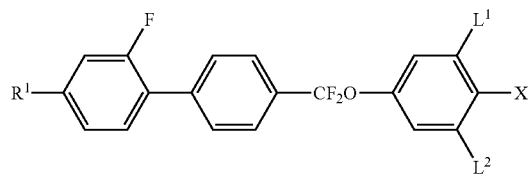

are prepared analogously (Table 1):

TABLE 1

| $R^1$ | X | $L^1$ | $L^2$ | Values |
|---|---|---|---|---|
| H | F | F | H | |
| $CH_3$ | F | F | H | |
| $C_2H_5$ | F | F | H | |
| n-$C_3H_7$ | F | F | H | C 25 N (14) I, $\Delta\epsilon$ 14, $\Delta n$ 0.143, $\gamma_1$ 119 mPa·s |
| n-$C_3H_7$ | F | H | H | C 40 N 57 I, $\Delta\epsilon$ 10, $\Delta n$ 0.156, $\gamma_1$ 121 mPa·s |
| n-$C_4H_9$ | F | F | H | |
| n-$C_5H_{11}$ | F | F | H | |
| n-$C_6H_{13}$ | F | F | H | |
| n-$C_7H_{15}$ | F | F | H | |
| CH=$CH_2$ | F | F | H | |
| CH=$CHCH_3$ | F | F | H | |
| H | F | F | F | |
| $CH_3$ | F | F | F | |
| $C_2H_5$ | F | F | F | C 49 I, $\Delta\epsilon$ 21, $\Delta n$ 0.124, $\gamma_1$ 51 mPa·s |
| n-$C_3H_7$ | F | F | F | cf. Example 1 |
| n-$C_4H_9$ | F | F | F | C 22 I, $\Delta\epsilon$ 18, $\Delta n$ 0.128, $\gamma_1$ 102 mPa·s |
| n-$C_5H_{11}$ | F | F | F | C 14 N (−5) I, $\Delta\epsilon$ 18, $\Delta n$ 0.124, $\gamma_1$ 121 mPa·s |
| n-$C_6H_{13}$ | F | F | F | |
| n-$C_7H_{15}$ | F | F | F | |

TABLE 1-continued

| R¹ | X | L¹ | L² | Values |
|---|---|---|---|---|
| CH=CH₂ | F | F | F | |
| CH=CHCH₃ | F | F | F | |
| H | OCF₃ | F | H | |
| CH₃ | OCF₃ | F | H | |
| C₂H₅ | OCF₃ | F | H | |
| n-C₃H₇ | OCF₃ | F | H | C 41 SmA (38) N (40) I, Δε 17, Δn 0.142, γ₁ 131 mPa·s |
| n-C₄H₉ | OCF₃ | F | H | |
| n-C₅H₁₁ | OCF₃ | F | H | |
| n-C₆H₁₃ | OCF₃ | F | H | |
| n-C₇H₁₅ | OCF₃ | F | H | |
| CH=CH₂ | OCF₃ | F | H | |
| CH=CHCH₃ | OCF₃ | F | H | |
| H | OCF₃ | F | F | |
| CH₃ | OCF₃ | F | F | |
| C₂H₅ | OCF₃ | F | F | |
| n-C₃H₇ | OCF₃ | F | F | C 41 SmA (21) I, Δε 21, Δn 0.134, γ₁ 147 mPa·s |
| n-C₄H₉ | OCF₃ | F | F | |
| n-C₅H₁₁ | OCF₃ | F | F | |
| n-C₆H₁₃ | OCF₃ | F | F | |
| n-C₇H₁₅ | OCF₃ | F | F | |
| CH=CH₂ | OCF₃ | F | F | |
| CH=CHCH₃ | OCF₃ | F | F | |
| H | Cl | F | H | |
| CH₃ | Cl | F | H | |
| C₂H₅ | Cl | F | H | |
| n-C₃H₇ | Cl | F | H | |
| n-C₄H₉ | Cl | F | H | |
| n-C₅H₁₁ | Cl | F | H | |
| n-C₆H₁₃ | Cl | F | H | |
| n-C₇H₁₅ | Cl | F | H | |
| CH=CH₂ | Cl | F | H | |
| CH=CHCH₃ | Cl | F | H | |
| H | Cl | F | F | |
| CH₃ | Cl | F | F | |
| C₂H₅ | Cl | F | F | |
| n-C₃H₇ | Cl | F | F | |
| n-C₄H₉ | Cl | F | F | |
| n-C₅H₁₁ | Cl | F | F | |
| n-C₆H₁₃ | Cl | F | F | |
| n-C₇H₁₅ | Cl | F | F | |
| CH=CH₂ | Cl | F | F | |
| CH=CHCH₃ | Cl | F | F | |
| H | CN | F | H | |
| CH₃ | CN | F | H | |
| C₂H₅ | CN | F | H | |
| n-C₃H₇ | CN | F | H | |
| n-C₄H₉ | CN | F | H | |
| n-C₅H₁₁ | CN | F | H | |
| n-C₆H₁₃ | CN | F | H | |
| n-C₇H₁₅ | CN | F | H | |
| CH=CH₂ | CN | F | H | |
| CH=CHCH₃ | CN | F | H | |
| H | CN | F | F | |
| CH₃ | CN | F | F | |
| C₂H₅ | CN | F | F | |
| n-C₃H₇ | CN | F | F | |
| n-C₄H₉ | CN | F | F | |
| n-C₅H₁₁ | CN | F | F | |
| n-C₆H₁₃ | CN | F | F | |
| n-C₇H₁₅ | CN | F | F | |
| CH=CH₂ | CN | F | F | |
| CH=CHCH₃ | CN | F | F | |
| H | OCHF₂ | F | H | |
| CH₃ | OCHF₂ | F | H | |
| C₂H₅ | OCHF₂ | F | H | |
| n-C₃H₇ | OCHF₂ | F | H | |
| n-C₄H₉ | OCHF₂ | F | H | |
| n-C₅H₁₁ | OCHF₂ | F | H | |
| n-C₆H₁₃ | OCHF₂ | F | H | |
| n-C₇H₁₅ | OCHF₂ | F | H | |
| CH=CH₂ | OCHF₂ | F | H | |
| CH=CHCH₃ | OCHF₂ | F | H | |
| H | OCHF₂ | F | F | |
| CH₃ | OCHF₂ | F | F | |
| C₂H₅ | OCHF₂ | F | F | |
| n-C₃H₇ | OCHF₂ | F | F | |
| n-C₄H₉ | OCHF₂ | F | F | |
| n-C₅H₁₁ | OCHF₂ | F | F | |
| n-C₆H₁₃ | OCHF₂ | F | F | |
| n-C₇H₁₅ | OCHF₂ | F | F | |
| CH=CH₂ | OCHF₂ | F | F | |
| CH=CHCH₃ | OCHF₂ | F | F | |
| H | CF₃ | F | H | |
| CH₃ | CF₃ | F | H | |
| C₂H₅ | CF₃ | F | H | |
| n-C₃H₇ | CF₃ | F | H | |
| n-C₄H₉ | CF₃ | F | H | |
| n-C₅H₁₁ | CF₃ | F | H | |
| n-C₆H₁₃ | CF₃ | F | H | |
| n-C₇H₁₅ | CF₃ | F | H | |
| CH=CH₂ | CF₃ | F | H | |
| CH=CHCH₃ | CF₃ | F | H | |
| H | CF₃ | F | F | |
| CH₃ | CF₃ | F | F | |
| C₂H₅ | CF₃ | F | F | |
| n-C₃H₇ | CF₃ | F | F | C 44 I, Δε 27, Δn 0.132, γ₁ 180 mPa·s |
| n-C₄H₉ | CF₃ | F | F | |
| n-C₅H₁₁ | CF₃ | F | F | |
| n-C₆H₁₃ | CF₃ | F | F | |
| n-C₇H₁₅ | CF₃ | F | F | |
| CH=CH₂ | CF₃ | F | F | |
| CH=CHCH₃ | CF₃ | F | F | |

EXAMPLE 2

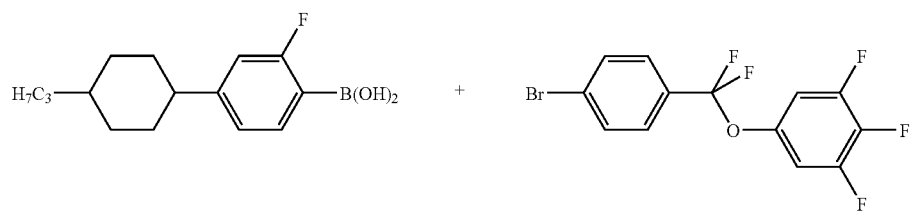

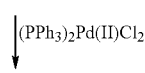

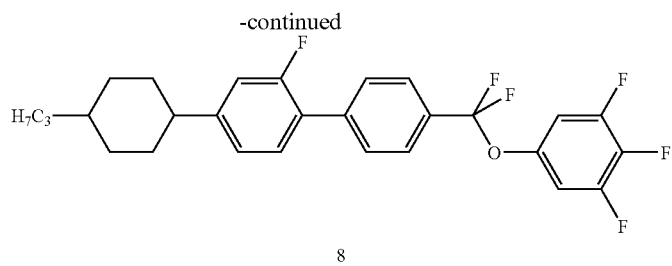

8

14.6 g (53 mmol) of sodium metaborate octahydrate are initially introduced in 52 ml of water and 50 ml of THF, and 1.0 g (1.4 mmol) of $(PPh_3)_2Pd(II)Cl_2$ and 0.07 ml (1.4 mmol) of hydrazinium hydroxide are added. After 5 min, 18.5 g (70 mmol) of the boronic acid 7, 24.7 g (70 mmol) of the bromide 5 and 56 ml of THF are added to the batch, which is heated at the boil for 6 h. The cooled reaction solution is diluted with 200 ml of MTB ether. The organic phase is separated off and evaporated. The residue is passed through silica gel (toluene/n-heptane 1:1). The final purification is carried out by crystallisation from n-heptane.

C 76 N 161 I

Δε 19

Δn 0.158

13.9 g (50 mmol) of sodium metaborate octahydrate are initially introduced in 37 ml of water and 40 ml of THF, and 716 mg (1 mmol) of $(PPh_3)_2Pd(II)Cl_2$ and 0.05 ml (1 mmol) of hydrazinium hydroxide are added. After 5 min, 12.9 g (50 mmol) of the boronic acid 9, 17.7 g (50 mmol) of the bromide 5 and 90 ml of THF are added to the batch, which is heated at the boil for 6 h. The cooled reaction solution is diluted with 200 ml of MTB ether. The organic phase is separated off and evaporated. The residue is passed through silica gel (toluene/n-heptane 1:1). The final purification is carried out by crystallisation from n-heptane/MTB ether 4:1.

C 102 SmA 150 N 178 I

Δε 22

Δn 0.240

EXAMPLE 3

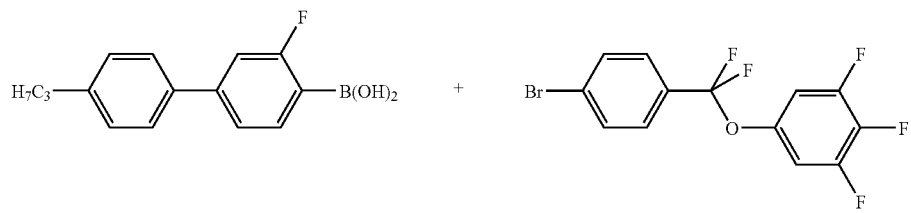

9      5

$(PPh_3)_2Pd(II)Cl_2$ ↓

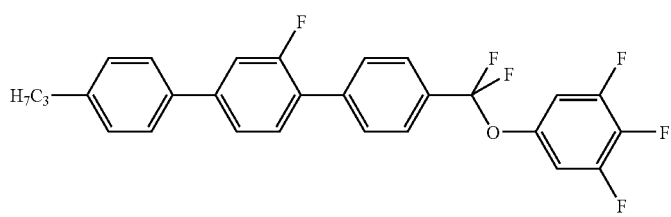

10

EXAMPLE 4

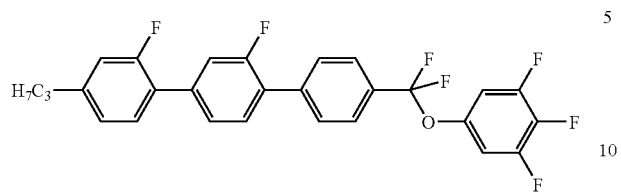

Reaction Step 4.1

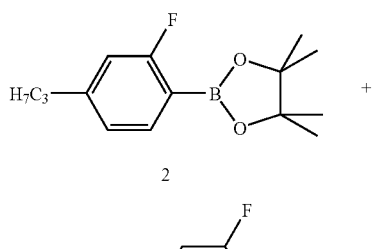

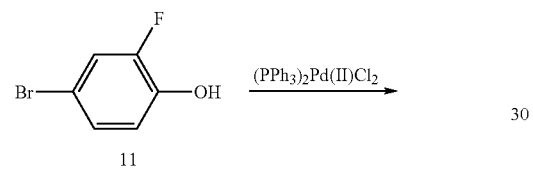

19.0 g (69 mmol) of sodium metaborate octahydrate are initially introduced in 27 ml of water and 40 ml of THF, and 643 mg (0.9 mmol) of $(PPh_3)_2Pd(II)Cl_2$ and 0.05 ml (1 mmol) of hydrazinium hydroxide are added. After 5 min, 10.9 g (37 mmol) of the boronic ester 2, 7.5 g (38 mmol) of the phenol 11 and 65 ml of THF are added to the batch, which is heated at the boil for 8 h. The cooled reaction solution is diluted with 100 ml of MTB ether. The organic phase is separated off and evaporated. The residue is employed without further purification.

Reaction Step 4.2

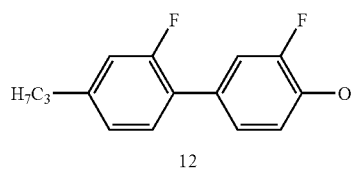

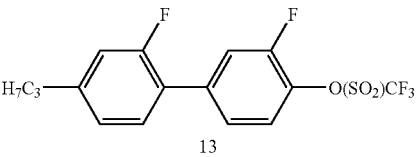

At 0° C., 8.3 ml (51 mmol) of trifluoromethanesulfonic anhydride are added to a solution of 14.4 g (42 mmol) of the phenol 12, 10 ml of triethylamine and 125 mg of DMAP in 150 ml of dichloromethane, and the mixture is subsequently stirred at RT for 18 h. The batch is washed twice with ice-water and evaporated. The residue is passed through silica gel (toluene/n-heptane 1:4). The liquid obtained is reacted without further purification.

Reaction Step 4.3

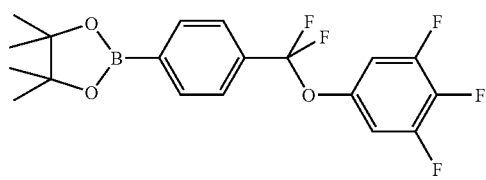

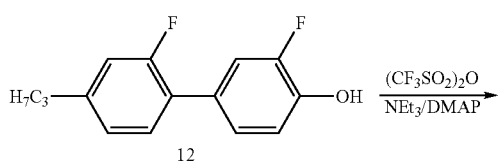

135 g (520 mmol) of the boron compound 3, 102 g (1.04 mol) of potassium acetate and 7.6 g (10 mmol) of $PdCl_2$-dppf are added to a solution of 122 g (350 mmol) of the bromide 5 in 900 ml of dioxane, and the mixture is warmed at 100° C. for 4 h. Water is added to the cooled batch, which is extracted with MTB ether. The organic phase is dried over sodium sulfate and evaporated. The residue is filtered through silica gel (toluene) and crystallised from ethanol.

Reaction Step 4.4

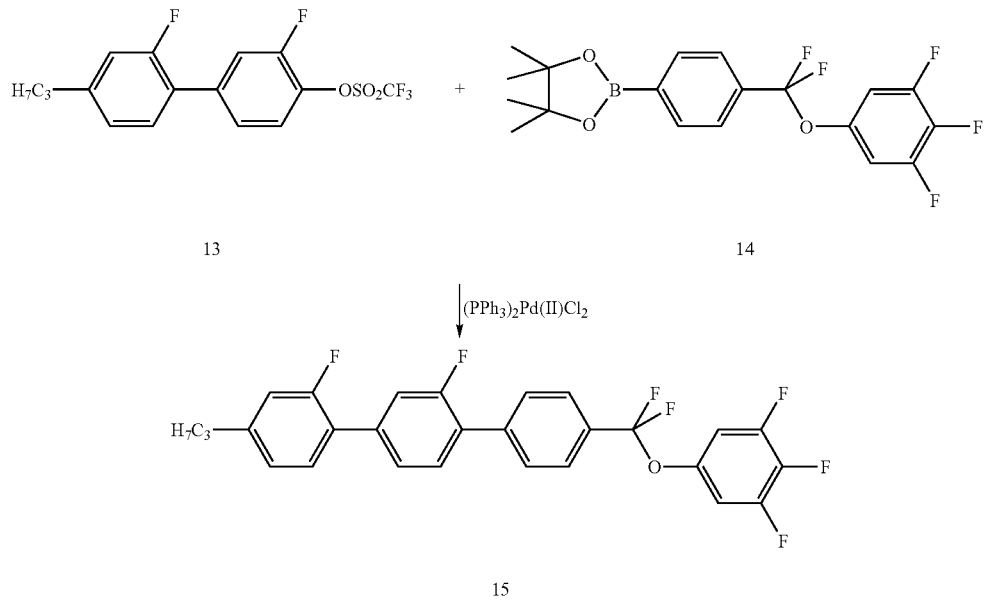

10.7 g (37 mmol) of sodium metaborate octahydrate are initially introduced in 15 ml of water and 15 ml of THF, and 351 mg (0.5 mmol) of $(PPh_3)_2Pd(II)Cl_2$ and 0.03 ml (0.5 mmol) of hydrazinium hydroxide are added. After 5 min, 10.0 g (24 mmol) of the boronic ester 14, 9.2 g (24 mmol) of the triflate 13 and 90 ml of THF are added to the batch, which is heated at the boil for 6 h. The cooled reaction solution is diluted with 100 ml of MTB ether. The organic phase is separated off and evaporated. The residue is passed through silica gel (toluene). The final purification is carried out by crystallisation from n-heptane.

C 93 SmA 104 N 152 I

Δε 24

Δn 0.220

EXAMPLE 5

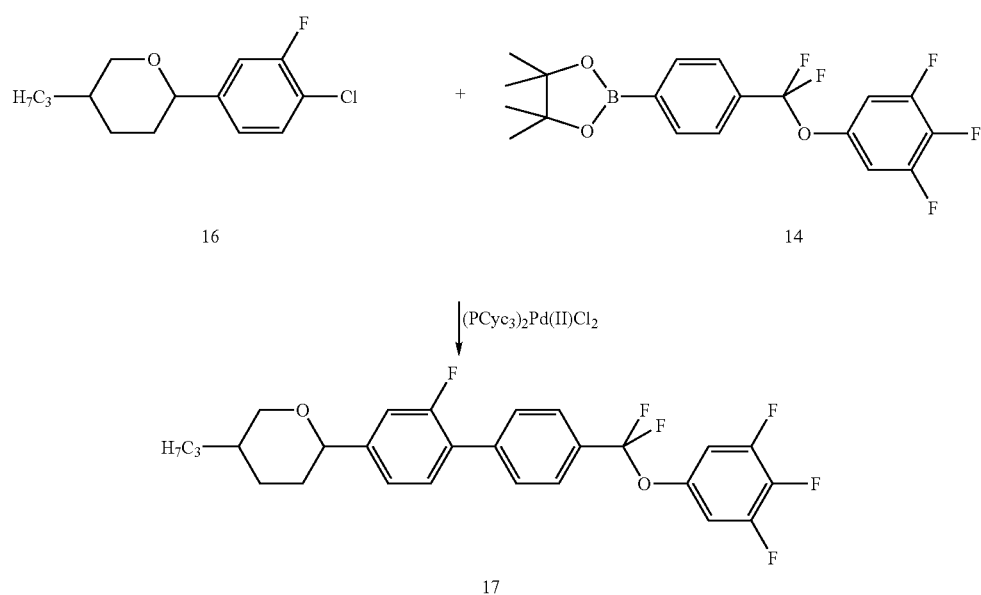

13.9 g (50 mmol) of sodium metaborate octahydrate are initially introduced in 19 ml of water and 18 ml of THF, and 738 mg (1 mmol) of (PCyc₃)₂Pd(II)Cl₂ and 0.1 ml (1 mmol) of hydrazinium hydroxide are added. After 5 min, 20.8 g (80 mmol) of the boronic ester 14, 13.7 g (50 mmol) of the chloride 16 and 55 ml of THF are added to the batch, which is heated at the boil for 8 h. The cooled reaction solution is diluted with 200 ml of MTB ether. The organic phase is separated off and evaporated. The residue is passed through silica gel (toluene/n-heptane 1:1). The final purification is carried out by crystallisation from acetonitrile and n-heptane.

C 66 SmA 87 N 147 I

Δε 22

Δn 0.155

The synthetic unit 16 is prepared analogously to scheme 1, WO 2004/048501 A1.

EXAMPLE 6

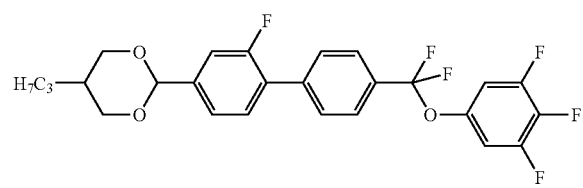

Reaction Step 6.1

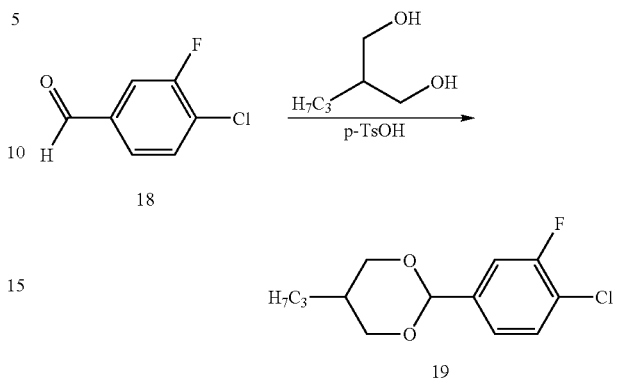

3.2 g (20 mmol) of the aldehyde 18 and 4.7 g (30 mmol) of the 1,3-diol are dissolved in 50 ml of toluene, 0.4 g of p-toluenesulfonic acid is added, and the mixture is heated on a water separator for 2 h. The cooled solution is washed with sat. sodium hydrogencarbonate solution and evaporated. The residue is passed through silica gel.

Reaction Step 6.2

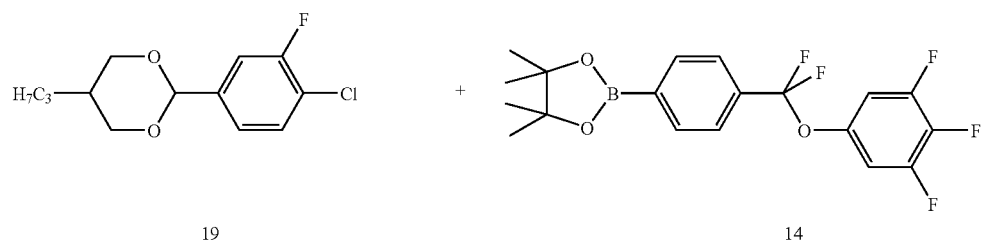

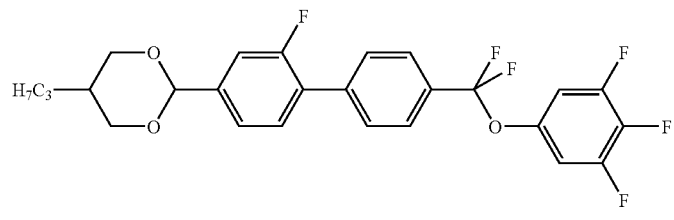

13.9 g (50 mmol) of sodium metaborate octahydrate are initially introduced in 19 ml of water and 18 ml of THF, and 738 mg (1 mmol) of (PCyc$_3$)$_2$Pd(II)Cl$_2$ and 0.1 ml (1 mmol) of hydrazinium hydroxide are added. After 5 min, 20.8 g (80 mmol) of the boronic ester 14, 12.9 g (50 mmol) of the chloride 19 and 55 ml of THF are added to the batch, which is heated at the boil for 8 h. The cooled reaction solution is diluted with 200 ml of MTB ether. The organic phase is separated off and evaporated. The residue is passed through silica gel (toluene/n-heptane 1:1). The final purification is carried out by crystallisation from acetonitrile and n-heptane.

C 109 SmA (95) N 153 I

Δε 28

Δn 0.165

EXAMPLE 7

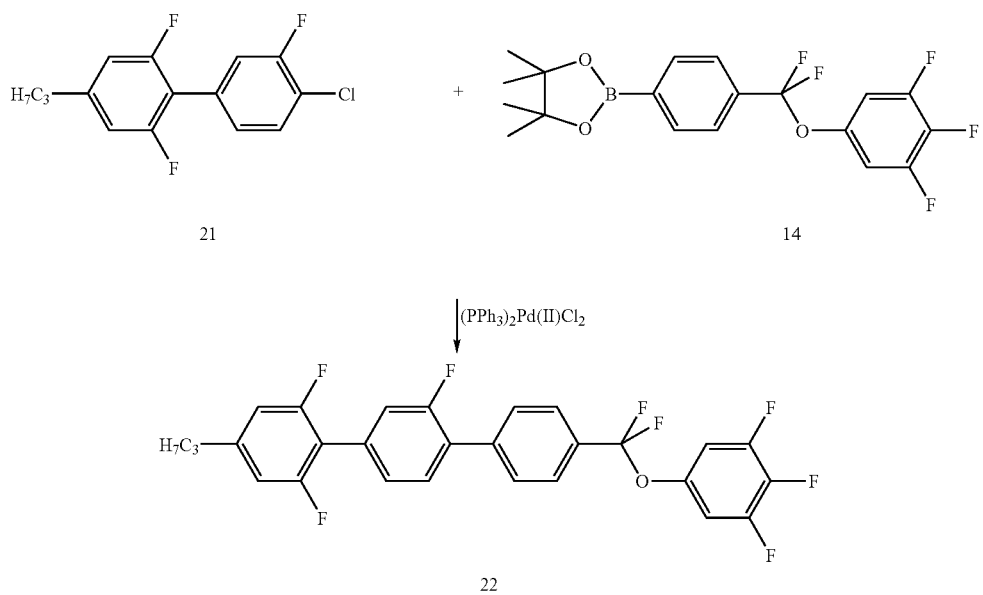

13.9 g (50 mmol) of sodium metaborate octahydrate are initially introduced in 19 ml of water and 18 ml of THF, and 738 mg (1 mmol) of (PCyc$_3$)$_2$Pd(II)Cl$_2$ and 0.1 ml (1 mmol) of hydrazinium hydroxide are added. After 5 min, 20.8 g (80 mmol) of the boronic ester 14, 14.2 g (50 mmol) of the chloride 21 and 55 ml of THF are added to the batch, which is heated at the boil for 8 h. The cooled reaction solution is diluted with 200 ml of MTB ether. The organic phase is separated off and evaporated. The residue is passed through silica gel (toluene/n-heptane 1:1). The final purification is carried out by crystallisation from acetonitrile and n-heptane.

The synthetic unit 21 is prepared in accordance with the following scheme:

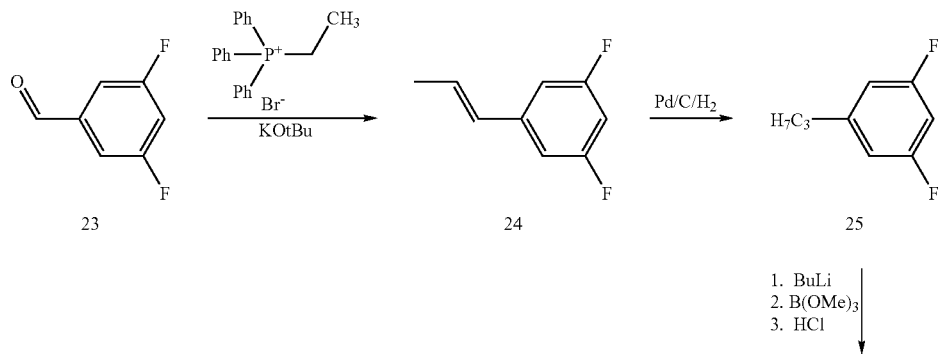

-continued

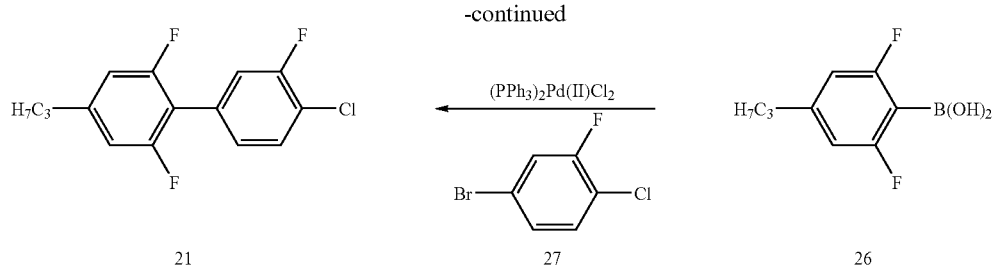

The aldehyde function in 23 is converted into an alkyl chain—here a propyl chain—in a Wittig reaction and subsequent hydrogenation. Deprotonation of the aromatic compound 25 between the fluorine atoms and reaction with trimethyl borate gives, after acidic hydrolysis, the boronic acid 26, which is converted into the unit 21 in a palladium-catalysed boronic acid coupling with the halogenated benzene 27.

C 120 N 123 I

Δε 29

Δn 0.206

The following further compounds are prepared in accordance with the syntheses described (Table 2):

TABLE 2

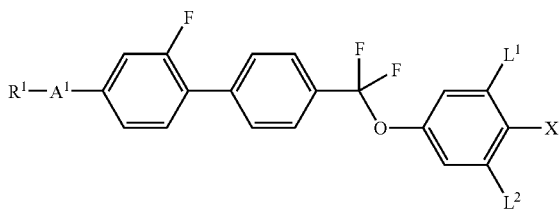

| $R^1$ | $A^1$ | X | $L^1$ | $L^2$ | Values |
|---|---|---|---|---|---|
| H | cyclohexyl | F | F | H | |
| CH$_3$ | cyclohexyl | F | F | H | |
| C$_2$H$_5$ | cyclohexyl | F | F | H | |
| n-C$_3$H$_7$ | cyclohexyl | F | F | H | |
| n-C$_4$H$_9$ | cyclohexyl | F | F | H | |
| n-C$_5$H$_{11}$ | cyclohexyl | F | F | H | |
| n-C$_6$H$_{13}$ | cyclohexyl | F | F | H | |
| n-C$_7$H$_{15}$ | cyclohexyl | F | F | H | |

TABLE 2-continued
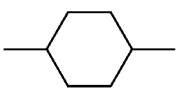
| R¹ | A¹ | X | L¹ | L² | Values |
|---|---|---|---|---|---|
| CH=CH₂ | 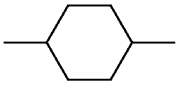 | F | F | H | |
| CH=CHCH₃ | 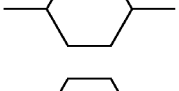 | F | F | H | |
| H | 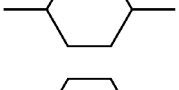 | F | F | F | |
| CH₃ | 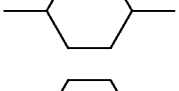 | F | F | F | |
| C₂H₅ | 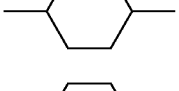 | F | F | F | |
| n-C₃H₇ | 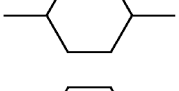 | F | F | F | cf. Example 2 |
| n-C₄H₉ | 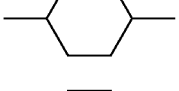 | F | F | F | |
| n-C₅H₁₁ | 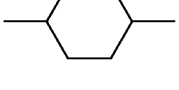 | F | F | F | |
| n-C₆H₁₃ | 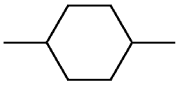 | F | F | F | |
| n-C₇H₁₅ | 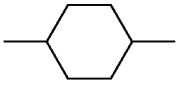 | F | F | F | |
| CH=CH₂ |  | F | F | F | |
| CH=CHCH₃ |  | F | F | F | |
| H | 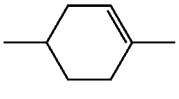 | F | F | H | |

TABLE 2-continued

R¹—A¹—[2-F-phenyl]—[phenyl]—CF₂—O—[phenyl(L¹,L²)]—X

| R¹ | A¹ | X | L¹ | L² | Values |
|---|---|---|---|---|---|
| CH₃ | cyclohexenyl | F | F | H | |
| C₂H₅ | cyclohexenyl | F | F | H | |
| n-C₃H₇ | cyclohexenyl | F | F | H | |
| n-C₄H₉ | cyclohexenyl | F | F | H | |
| n-C₅H₁₁ | cyclohexenyl | F | F | H | |
| n-C₆H₁₃ | cyclohexenyl | F | F | H | |
| n-C₇H₁₅ | cyclohexenyl | F | F | H | |
| CH=CH₂ | cyclohexenyl | F | F | H | |
| CH=CHCH₃ | cyclohexenyl | F | F | H | |
| H | cyclohexenyl | F | F | F | |
| CH₃ | cyclohexenyl | F | F | F | |
| C₂H₅ | cyclohexenyl | F | F | F | |
| n-C₃H₇ | cyclohexenyl | F | F | F | C 78 SmA 109 N 161 I, Δε 22, Δn 0.203 |

TABLE 2-continued

[Structure: R¹—A¹—(2-fluorophenyl)—(phenyl)—CF₂—O—(phenyl with L¹, L², X substituents)]

| R¹ | A¹ | X | L¹ | L² | Values |
|---|---|---|---|---|---|
| n-C₄H₉ | cyclohexenyl | F | F | F | |
| n-C₅H₁₁ | cyclohexenyl | F | F | F | |
| n-C₆H₁₃ | cyclohexenyl | F | F | F | |
| n-C₇H₁₅ | cyclohexenyl | F | F | F | |
| CH=CH₂ | cyclohexenyl | F | F | F | |
| CH=CHCH₃ | cyclohexenyl | F | F | F | |
| n-C₃H₇ | phenyl | F | H | H | C 98 SmC (65) SmA' (94) SmA 150 N 225 I, Δε12, Δn 0.256 |
| H | phenyl | F | F | H | |
| CH₃ | phenyl | F | F | H | |
| C₂H₅ | phenyl | F | F | H | |
| n-C₃H₇ | phenyl | F | F | H | |
| n-C₄H₉ | phenyl | F | F | H | |
| n-C₅H₁₁ | phenyl | F | F | H | |

TABLE 2-continued
| R¹ | A¹ | X | L¹ | L² | Values |
|---|---|---|---|---|---|
| n-C$_6$H$_{13}$ |  | F | F | H | |
| n-C$_7$H$_{15}$ |  | F | F | H | |
| CH=CH$_2$ |  | F | F | H | |
| CH=CHCH$_3$ | 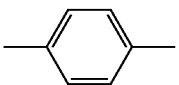 | F | F | H | |
| H | 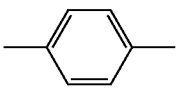 | F | F | F | |
| CH$_3$ |  | F | F | F | |
| C$_2$H$_5$ |  | F | F | F | |
| n-C$_3$H$_7$ |  | F | F | F | cf. Example 3 |
| n-C$_4$H$_9$ | 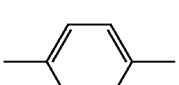 | F | F | F | |
| n-C$_5$H$_{11}$ | 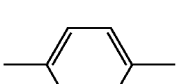 | F | F | F | |
| n-C$_6$H$_{13}$ | 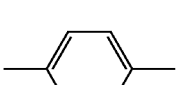 | F | F | F | |
| n-C$_7$H$_{15}$ | 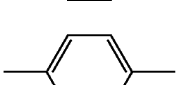 | F | F | F | |
| CH=CH$_2$ | 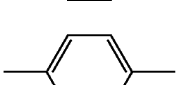 | F | F | F | |

TABLE 2-continued
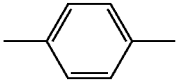
| R¹ | A¹ | X | L¹ | L² Values |
|---|---|---|---|---|
| CH=CHCH₃ | 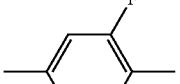 | F | F | F |
| H | 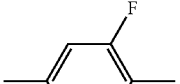 | F | F | H |
| CH₃ | 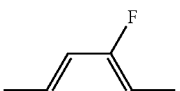 | F | F | H |
| C₂H₅ | 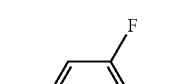 | F | F | H |
| n-C₃H₇ | 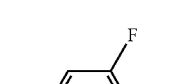 | F | F | H |
| n-C₄H₉ | 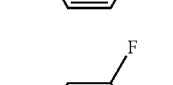 | F | F | H |
| n-C₅H₁₁ | 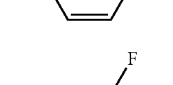 | F | F | H |
| n-C₆H₁₃ | 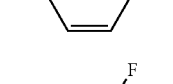 | F | F | H |
| n-C₇H₁₅ | F | F | F | H |
| CH=CH₂ | 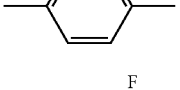 | F | F | H |

TABLE 2-continued
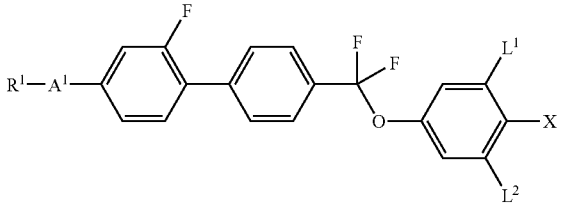
| R¹ | A¹ | X | L¹ | L² | Values |
|---|---|---|---|---|---|
| CH=CHCH₃ | 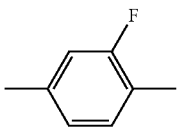 | F | F | H | |
| H | 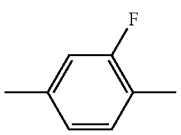 | F | F | F | |
| CH₃ | 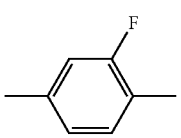 | F | F | F | |
| C₂H₅ | 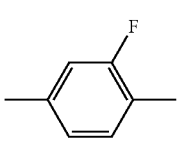 | F | F | F | |
| n-C₃H₇ | 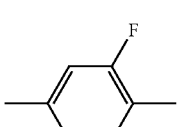 | F | F | F | cf. Example 4 |
| n-C₄H₉ | 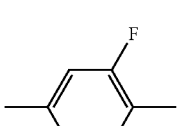 | F | F | F | |
| n-C₅H₁₁ | 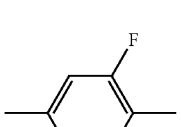 | F | F | F | |
| n-C₆H₁₃ | 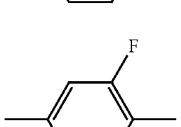 | F | F | F | |
| n-C₇H₁₅ | 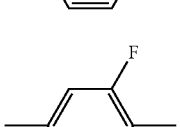 | F | F | F | |

TABLE 2-continued

R¹—A¹—[2-F-phenyl]—[phenyl]—CF₂—O—[phenyl(L¹,L²)]—X

| R¹ | A¹ | X | L¹ | L² | Values |
|---|---|---|---|---|---|
| CH=CH₂ | 2-F-phenyl | F | F | F | |
| CH=CHCH₃ | 2-F-phenyl | F | F | F | |
| H | 2,3-diF-phenyl | F | F | H | |
| CH₃ | 2,3-diF-phenyl | F | F | H | |
| C₂H₅ | 2,3-diF-phenyl | F | F | H | |
| n-C₃H₇ | 2,3-diF-phenyl | F | F | H | |
| n-C₄H₉ | 2,3-diF-phenyl | F | F | H | |
| n-C₅H₁₁ | 2,3-diF-phenyl | F | F | H | |

TABLE 2-continued

*[Structure: R¹–A¹–(2-fluorophenyl)–(phenyl)–CF₂–O–(phenyl with L¹, L², X substituents)]*

| R¹ | A¹ | X | L¹ | L² Values |
|---|---|---|---|---|
| n-C₆H₁₃ | 2,3-difluoro-1,4-phenylene | F | F | H |
| n-C₇H₁₅ | 2,3-difluoro-1,4-phenylene | F | F | H |
| CH=CH₂ | 2,3-difluoro-1,4-phenylene | F | F | H |
| CH=CHCH₃ | 2,3-difluoro-1,4-phenylene | F | F | H |
| H | 2,3-difluoro-1,4-phenylene | F | F | F |
| CH₃ | 2,3-difluoro-1,4-phenylene | F | F | F |
| C₂H₅ | 2,3-difluoro-1,4-phenylene | F | F | F |

TABLE 2-continued
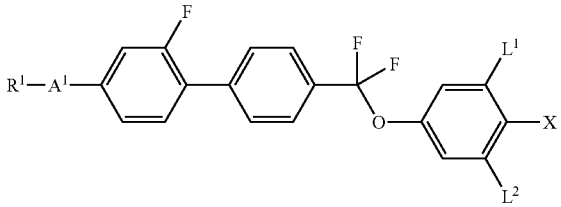
| R¹ | A¹ | X | L¹ | L² | Values |
|---|---|---|---|---|---|
| n-C$_3$H$_7$ | 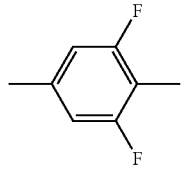 | F | F | F | cf. Example 7 |
| n-C$_4$H$_9$ | 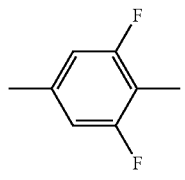 | F | F | F | |
| n-C$_5$H$_{11}$ | 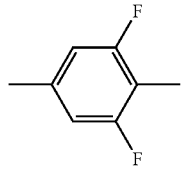 | F | F | F | |
| n-C$_6$H$_{13}$ | 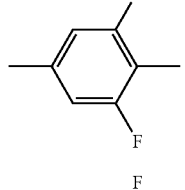 | F | F | F | |
| n-C$_7$H$_{15}$ | 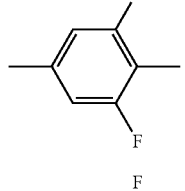 | F | F | F | |
| CH=CH$_2$ | 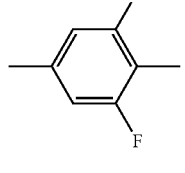 | F | F | F | |
| CH=CHCH$_3$ | | F | F | F | |
| H | 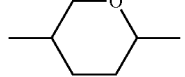 | F | F | H | |

TABLE 2-continued
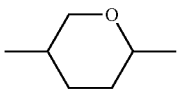
| R¹ | A¹ | X | L¹ | L² Values |
|---|---|---|---|---|
| CH₃ | 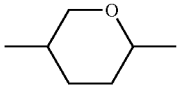 | F | F | H |
| C₂H₅ |  | F | F | H |
| n-C₃H₇ | 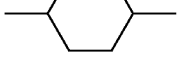 | F | F | H |
| n-C₄H₉ | 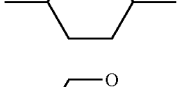 | F | F | H |
| n-C₅H₁₁ | 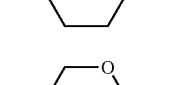 | F | F | H |
| n-C₆H₁₃ | 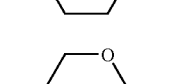 | F | F | H |
| n-C₇H₁₅ | 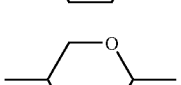 | F | F | H |
| CH=CH₂ | 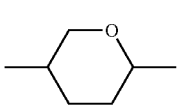 | F | F | H |
| CH=CHCH₃ | 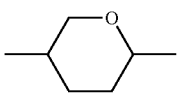 | F | F | H |
| H | | F | F | F |
| CH₃ | 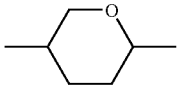 | F | F | F |
| C₂H₅ |  | F | F | F |

TABLE 2-continued
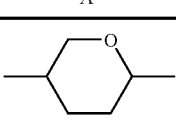
| R¹ | A¹ | X | L¹ | L² | Values |
|---|---|---|---|---|---|
| n-C$_3$H$_7$ | 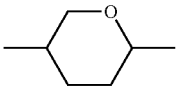 | F | F | F | cf. Example 5 |
| n-C$_4$H$_9$ | 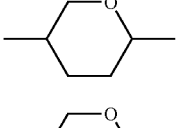 | F | F | F | |
| n-C$_5$H$_{11}$ | 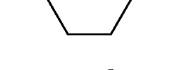 | F | F | F | |
| n-C$_6$H$_{13}$ | 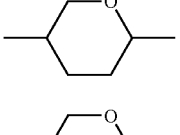 | F | F | F | |
| n-C$_7$H$_{15}$ | 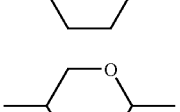 | F | F | F | |
| CH=CH$_2$ | 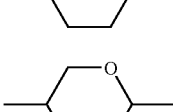 | F | F | F | |
| CH=CHCH$_3$ | 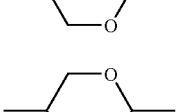 | F | F | F | |
| H | 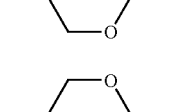 | F | F | H | |
| CH$_3$ | 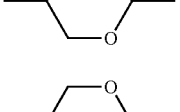 | F | F | H | |
| C$_2$H$_5$ | 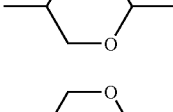 | F | F | H | |
| n-C$_3$H$_7$ | 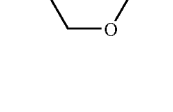 | F | F | H | |
| n-C$_4$H$_9$ | 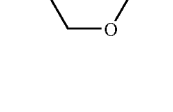 | F | F | H | |

TABLE 2-continued

| R¹ | A¹ | X | L¹ | L² | Values |
|---|---|---|---|---|---|
| n-C₅H₁₁ | dioxane | F | F | H | |
| n-C₆H₁₃ | dioxane | F | F | H | |
| n-C₇H₁₅ | dioxane | F | F | H | |
| CH=CH₂ | dioxane | F | F | H | |
| CH=CHCH₃ | dioxane | F | F | H | |
| H | dioxane | F | F | F | |
| CH₃ | dioxane | F | F | F | |
| C₂H₅ | dioxane | F | F | F | |
| n-C₃H₇ | dioxane | F | F | F | cf. Example 6 |
| n-C₄H₉ | dioxane | F | F | F | |
| n-C₅H₁₁ | dioxane | F | F | F | |
| n-C₆H₁₃ | dioxane | F | F | F | |

TABLE 2-continued

| $R^1$ | $A^1$ | X | $L^1$ | $L^2$ | Values |
|---|---|---|---|---|---|
| n-$C_7H_{15}$ | (dioxane) | F | F | F | |
| CH=$CH_2$ | (dioxane) | F | F | F | |
| CH=$CHCH_3$ | (dioxane) | F | F | F | |
| n-$C_3H_7$ | (cyclohexane) | $OCF_3$ | F | H | C 42 SmB (30) SmA 131 N 190 I, Δε 17, Δn 0.162 |
| n-$C_3H_7$ | (cyclohexene) | $OCF_3$ | F | H | C 31 Sm (18) SmA 177 N 193 I, Δε 18, Δn 0.197 |
| n-$C_3H_7$ | (pyran) | $OCF_3$ | F | H | C 65 SmA 162 N 179 I, Δε 19, Δn 0.193 |
| n-$C_3H_7$ | (dioxane) | $OCF_3$ | F | H | C 58 SmA 170 N 181 I, Δε 24, Δn 0.157 |
| n-$C_3H_7$ | (phenyl) | $OCF_3$ | F | H | C 68 SmB 80 SmA 208 N 213 I, Δε 17, Δn 0.233 |

Further combinations of the embodiments and variants of the invention in accordance with the description also arise from the following claims.

The preceding examples can be repeated with similar success by substituting the generically or specifically described reactants and/or operating conditions of this invention for those used in the preceding examples.

The entire disclosures of all applications, patents and publications, cited herein and of corresponding German application No. 102006842859.5, filed Sep. 13, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A compound of formula I

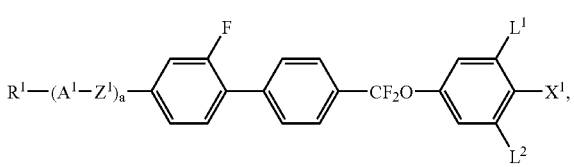

in which $R^1$ denotes H, F, Cl, Br, a halogenated or unsubstituted alkyl radical having 1 to 15 C atoms, in which one or more $CH_2$ groups are optionally, independently of one another, replaced by —C≡C—, —(CO)O—, —O(CO)—, —(CO)— or —O— in such a way that O atoms are not linked directly to one another, A¹ denotes
a) trans-1,4-cyclohexylene or cyclohexenylene, in which one or more non-adjacent CH₂ groups are optionally replaced by —O— and/or —S—, and in which H may be substituted by F,
b) 1,4-phenylene, in which one or two CH groups are optionally replaced by N and in which one or more H atoms are optionally replaced by Br, Cl, F, CN, methyl, methoxy or a mono- or polyfluorinated methyl or methoxy group, Z¹ denotes a single bond, —CH₂O—, —(CO)O—, —CF₂O—, —CH₂CH₂CF₂O—, —CF₂CF₂—, —CH₂CF₂—, —CH₂CH₂—, —(CH₂)₄—, —CH=CH—, —CH=CF—, —CF=CF— or where an asymmetrical Z¹ group may be oriented to either direction in formula I, L¹ and L², independently of one another, denote H or F, X¹ denotes F, Cl, CN, SF₅, a halogenated alkyl radical, halogenated alkoxy radical, halogenated alkenyl radical or halogenated alkenyloxy radical, each having up to 7 C atoms, and a denotes 0, 1 or 2.

2. A compound according to claim 1, which is of formula IA

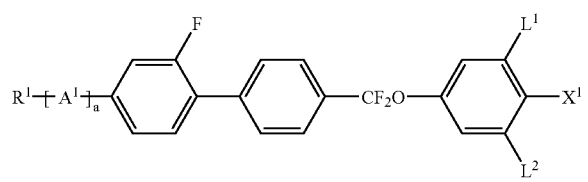

IA in which
R¹, A¹, L¹, L², X¹ and a have the meanings indicated for formula I.

3. A compound according to claim 1, wherein
R¹ denotes alkyl, or alkoxy, having up to 8 carbon atoms.

4. A compound according to claim 1, wherein L¹ denotes fluorine and L² denotes fluorine or hydrogen.

5. A compound according to claim 1, which is of formulae I1 to I8

I1
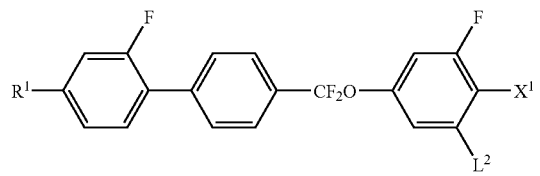

I2
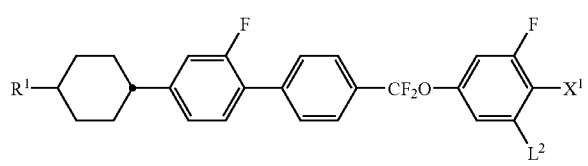

I3
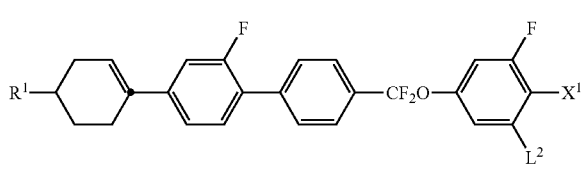

I4
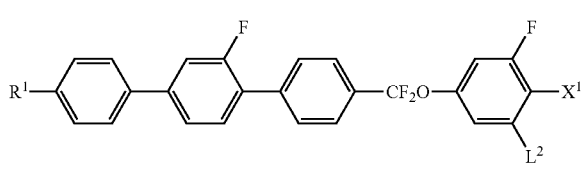

I5
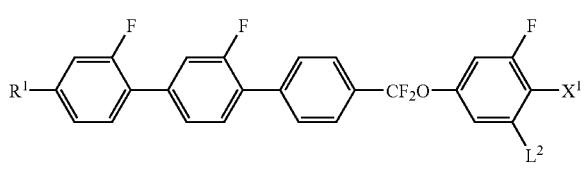

I6
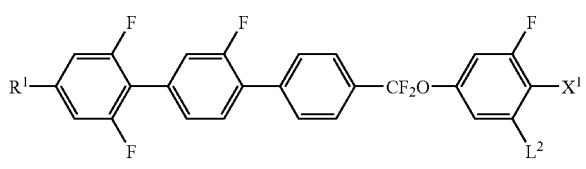

I7
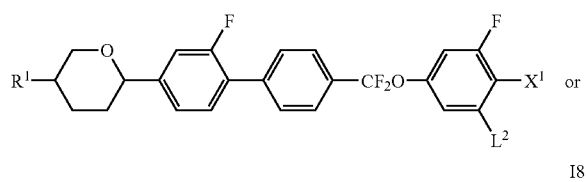

or

I8
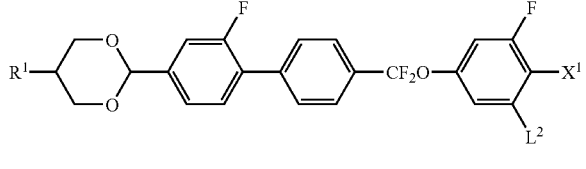

in which R¹, L² and X¹ have the meanings indicated for formula I.

6. A compound according to claim 1, wherein L¹ and L² denote fluorine.

7. A process for preparing a compound of formula I according to claim 1, comprising reacting a boronic acid of formula IIA or an open-chain or cyclic boronic acid ester of formula IIB IIA
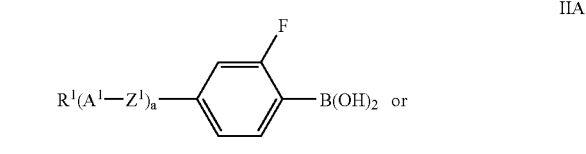

-continued

IIB

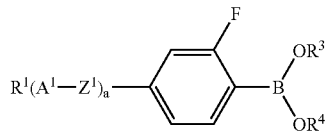

in which $R^1$, $A^1$, $Z^1$ and a are as defined for formula I, and
$R^3$ and $R^4$ each, independently, denote an alkyl having 1-12 C atoms, which alkyl may be substituted, or
$R^3+R^4$ together denote an alkylene or 1,2-phenylene, which alkylene or phenylene may be substituted,
with a compound of formula III

III

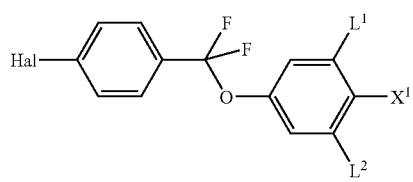

in which $L^1$, $L^2$ and $X^1$ are as defined for formula I, and
Hal denotes $O(SO_2)CF_3$, Cl, Br or I,
in the presence of a transition-metal catalyst.

8. A process for preparing a compound of formula I according to claim 1, comprising reacting a compound containing a leaving group Hal' of formula IV

IV

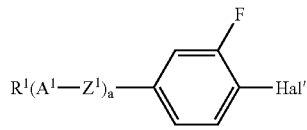

in which $R^1$, $A^1$, $Z^1$ and a are as defined for formula I, and
Hal' denotes —$O(SO_2)CF_3$, Cl, Br or I,
with a boronie acid or an open-chain or cyclic boronic acid ester of formula V

V

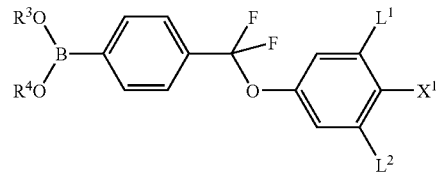

in which $L^1$, $L^2$ and $X^1$ are as defined for formula I, and
$R^3$ and $R^4$ each, independently, denote H, or an alkyl having 1-12 C atoms, which alkyl may be substituted, or
$R^3+R^4$ together denote an alkylene or 1,2-phenylene, which alkylene or phenylene may be substituted,
in the presence of a transition-metal catalyst.

9. A liquid-crystalline medium comprising at least two mesogenic compounds, one of which is a compound of formula I according to claim 1.

10. An electro-optical apparatus comprising a liquid-crystalline medium according to claim 9.

11. An electro-optical liquid-crystal display containing a liquid-crystalline medium according to claim 9.

12. A compound according to claim 1, wherein $A^1$ denotes

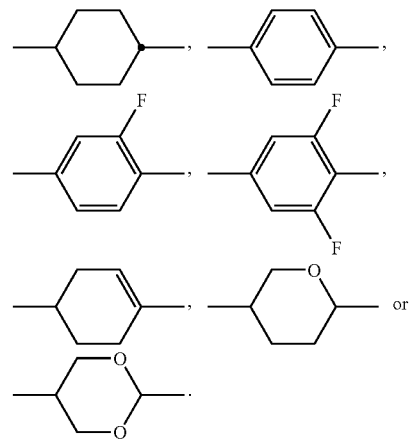

* * * * *

UNITED STATES PATENT AND TRADEMARK OFFICE
CERTIFICATE OF CORRECTION

| | | |
|---|---|---|
| PATENT NO. | : 7,767,277 B2 | Page 1 of 1 |
| APPLICATION NO. | : 11/898404 | |
| DATED | : August 3, 2010 | |
| INVENTOR(S) | : Lietzau et al. | |

It is certified that error appears in the above-identified patent and that said Letters Patent is hereby corrected as shown below:

Column 55, line 17, reads "—CH=CH—, —CH=CF—, —CF=CF— or where an" SHOULD READ -- —CH=CH—, —CH=CF—, —CF=CF— or —C≡C— where an--

Signed and Sealed this

Twenty-fifth Day of January, 2011

David J. Kappos
*Director of the United States Patent and Trademark Office*